United States Patent
Avila et al.

(10) Patent No.: US 6,744,911 B1
(45) Date of Patent: Jun. 1, 2004

(54) TOMOGRAPHIC SEGMENTATION

(75) Inventors: Ricardo Scott Avila, Clifton Park, NY (US); Christopher Richard Volpe, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 560 days.

(21) Appl. No.: 09/721,194

(22) Filed: Nov. 22, 2000

(51) Int. Cl.$^7$ ................................................. G06K 9/00
(52) U.S. Cl. ...................................................... 382/131
(58) Field of Search ................................ 382/128, 131, 382/132, 154; 378/4, 21, 62, 63, 87; 250/363.04, 370.04; 600/410, 425, 443, 463; 128/915, 916, 922

(56) References Cited

U.S. PATENT DOCUMENTS

| | | | |
|---|---|---|---|
| 5,226,113 A | 7/1993 | Cline et al. ................. | 345/424 |
| 5,793,375 A * | 8/1998 | Tanaka ........................ | 345/426 |
| 5,832,134 A | 11/1998 | Avinash et al. .............. | 382/257 |
| 5,865,750 A | 2/1999 | Hatfield et al. .............. | 600/443 |
| 5,891,030 A * | 4/1999 | Johnson et al. .............. | 600/407 |
| 5,959,631 A * | 9/1999 | Knittel ........................ | 345/420 |
| 6,211,884 B1 * | 4/2001 | Knittel et al. ................ | 345/424 |
| 6,343,936 B1 * | 2/2002 | Kaufman et al. ........... | 434/262 |
| 6,353,677 B1 * | 3/2002 | Pfister et al. ................ | 382/154 |

* cited by examiner

Primary Examiner—Andrew W. Johns
Assistant Examiner—Shervin Nakhjavan
(74) Attorney, Agent, or Firm—Jean K. Testa; Patrick K. Patnode

(57) ABSTRACT

A method for segmenting an input volume in accordance with at least one selected characteristic comprises the steps of casting a plurality of rays along a plurality of views of the input volume, identifying regions corresponding to the selected characteristic within each ray, and processing the identified regions to generate an output volume indicating regions having the selected characteristic.

10 Claims, 3 Drawing Sheets

TOMOGRAPHIC SEGMENTATION

BACKGROUND OF THE INVENTION

The present invention relates to image processing and more particularly segmenting and classifying a region or data type of interest based on selected characteristics.

Identification of contiguous regions of the same material is known as segmentation. The automatic classification or segmentation of medical images into anatomical regions, for example bone, kidney or lung, is a difficult problem that is currently stalling the development of many clinical applications. While several techniques have been proposed over the years, very few techniques have achieved the high degree of automation and quality required by routine medical practice. Instead, most clinical applications rely on a large amount of user interaction. Thus, the process of segmentation is time-consuming, error prone, and subjective.

The human skeletal system is mainly comprised of two types of bone cortical bone and trabecular bone. Cortical bone is quite dense and typically located at the perimeter of a bone region. Trabecular bone is spongy and is typically located in interior bone regions. As a result, bone regions have several distinct characteristics that are nearly universal in the patient CT scan population. CT densities rapidly rise at bone boundaries (cortical) and then drop modestly within a few millimeters, thereby creating a "ring" effect in scan data. The structure of interior bone (trabecular) has a distinct spongy pattern that is characterized by constant change and relatively high frequency. The CT bone values range from 1200 to greater than 2000 Hounsfeld units for cortical bone, and trabecular ranging from 1000 to 1300 Hounsfeld units.

Although bone, and in particular cortical bone, presents itself as a high density signal which is higher than most any other region of the human body, segmentation of bone is not effectively performed with simple thresholding, a known technique of segmenting based on minimum or maximum CT numbers. Often, a foreign object or substance, such as a contrast agent, is introduced into a patient that exhibit CT densities that are indistinguishable from bone. This is most difficult in the case of a contrast enhanced CT scan where a liquid agent is injected into the blood stream resulting in vascular regions with CT numbers equal to or higher than bone.

The specific problem of identifying and removing bone from contrast enhanced computed tomography (CT) data illustrates many segmentation issues. CT values in contrast enhanced regions cannot be easily distinguished from other high density structures such as bone. Medical segmentation research has not revealed an automatic bone segmentation technique capable of robust identification of bone, despite the relative ease in which a human operator can perform the task. What is needed is a segmentation technique for classifying bone and other anatomical regions with high density characteristics in CT scan data, and to further distinguish bone from other regions.

BRIEF SUMMARY OF THE INVENTION

A method for segmenting an input volume in accordance with at least one selected characteristic comprises the steps of casting a plurality of rays along a plurality of views of the input volume, identifying regions corresponding to the selected characteristic within each ray, and processing the identified regions to generate an output volume indicating regions having the selected characteristic.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

In an embodiment of the present invention, a method of segmentation comprises the steps casting a plurality of rays through input data and classifying the resultant data in accordance with predetermined classification parameters or characteristics. Predetermined classification parameters, such as bone-like profile characteristics, are evaluated. Such characteristics include high gradient, outer entrance (exterior to cortical peak), very high valued entrance (cortical peak), high gradient inner entrance (cortical peak to start of trabecular), total cortical thickness usually around 2 mm, and fluctuating values in interior bone (trabecular).

Figure 1:
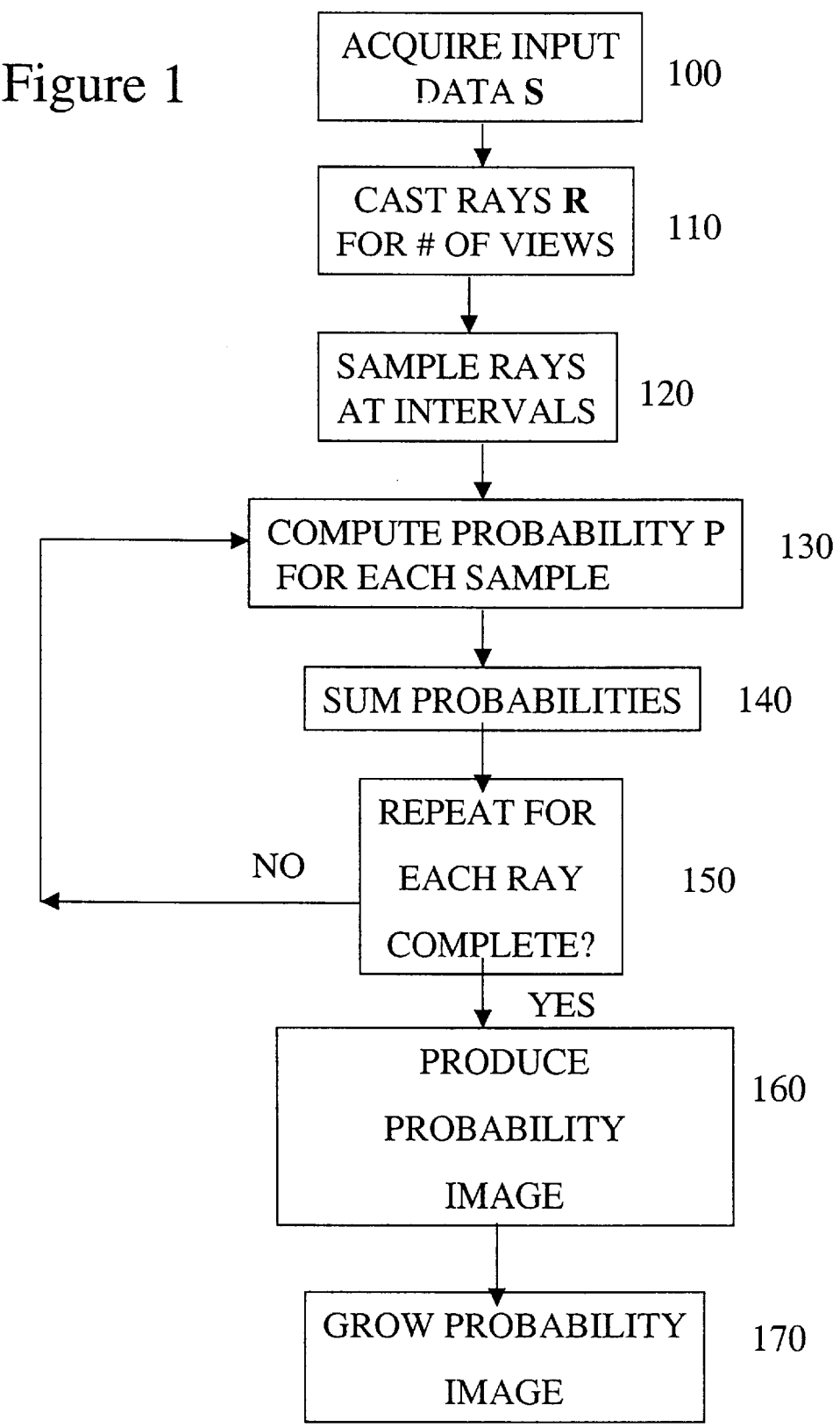
FIG. 1 is a block diagram showing a method of segmenting input data to which preferred embodiments of the present invention are applicable.

FIG. 1 shows a block diagram illustrating an embodiment of the present invention. Referring to FIG. 1, a method for segmenting input data for at least one selected characteristic is shown.

At step 100, input data S is acquired, for example a 2D scalar field. For illustration purposes only, this embodiment has a two-dimensional (2D) Computed Tomography (CT) image as the input volume. However, it is to be appreciated that the method for segmenting can operate on a two or three-dimensional scalar or vector field, such as found in other medical imaging applications (magnetic resonance (MR), ultrasound, X-ray) and other non-medical scanning or sensing applications.

Figure 2:
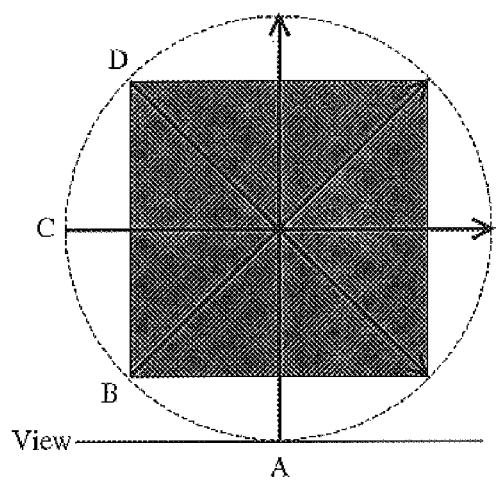
FIG. 2 is an illustration of representative input data to which preferred embodiments of the present invention are applicable.
Figure 3:
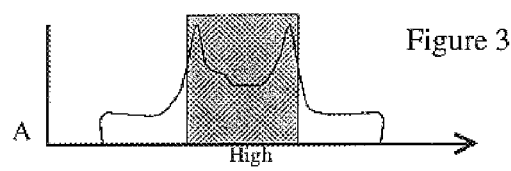
FIG. 3–6 are illustrations of scalar profiles for input data of FIG. 2.
Figure 4:
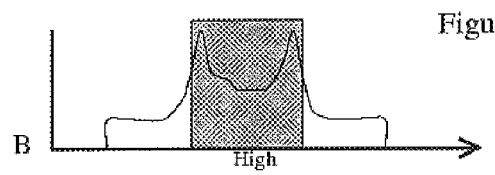
Figure 5:
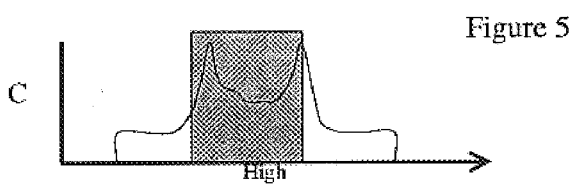
Figure 6:
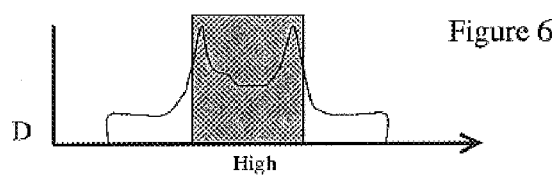

At step 110, a plurality of rays R are cast in the well-known technique of ray casting to sample the input volume and to produce a sampled one-dimensional (1D) representation of the input data suitable for array manipulation. Rays originate from one of many evenly rotated views V that are positioned on a circle that encloses S. The number of views V at an angle theta with respect to S are selected in a known manner based on considerations of image processing quality and speed requirements. In this embodiment, classification performed by sampling many trajectories or rays, usually linear, through the input image S as shown in step 120. A plurality of evenly spaced rays is projected from a view. FIG. 2 illustrates four single rays (A–D) originating from four corresponding views (one is shown). Referring further to FIG. 1, at step 130, probabilities that bone exists along the ray are computed, which will be discussed below in greater detail. As shown in step 140, the probabilities along each ray are then processed into the intermediate buffer P. Computations are repeated along each ray at step 150. When all trajectories have been computed and summed, the intermediate buffer P is converted into the final bone probability image B at step 160. At step 170, the final image is converted through specialized region growing. The region grow step 170 searches for other pixels that must also be bone but which could not be detected as such by tomographic analysis. This region growing is an iterative process that begins with marking highly-probably bone pixels as bone, and testing adjacent pixels based on an additional set of criteria that can determine if the adjacent pixel is part of the same anatomical structure as the previous pixel, regardless of whether it originally obtained a high probability score by the tomographic analysis. Further in this embodiment, boundary logic is desirably employed to ensure that bone probabilities are not corrupted by the lack of information beyond the perimeter of the scanned image.

The computation of bone probabilities for a ray (step 130, FIG. 1) is performed by analyzing the ray's scalar values and identifying the patterns indicative of bone density (cortical and trabecular). Alternatively, if the input data is other than medical image data, then the probability is calculated based on other predetermined classification values. For detecting bone, the probability computation processes each sample along the ray and takes note of when it appears the ray has entered bone and when it has exited. While many metrics can be used to calculate bone entrance and exit, one that showed early promise is to analyze the one-dimensional (1D) gradient (2D and 3D can be used and provide better information at the expense of processing time) along the ray. When a gradient g1 with a gradient magnitude that exceeds G1 is followed within 2 mm by an opposing gradient g2 with a gradient magnitude greater than G2, an entrance or an exit has occurred. It is often the case that if ($|g1|>|g2|$) then the ray has entered bone and if ($|g1|<|g2|$) the ray has most likely exited bone. It is to be appreciated that more advanced processing of bone entrance and exit is possible.

Another desirable parameter or characteristic is the frequency of the signal along the ray. Combining all of this information enables the ability to assign a probability that a given position along a ray is in a bone region. For instance, if ray processing indicates a bone entrance previously, a high frequency area, and a bone exit further down the ray, then the likelihood that this pixel is bone is relatively high. Each characteristic increases the confidence that the pixel is within a bone region.

FIGS. 2–6 illustrate the calculation of bone probability that occurs at a single pixel in the image. Referring to FIG. 2, four rays (A–D) intersect the pixel, each with a scalar profile shown on the left. The gray region along each ray indicates that bone is highly likely in this region. Since all trajectories agree, the sum of the probabilities will be high in this bone region. FIGS. 3–6 show the trajectories.

Figure 7:
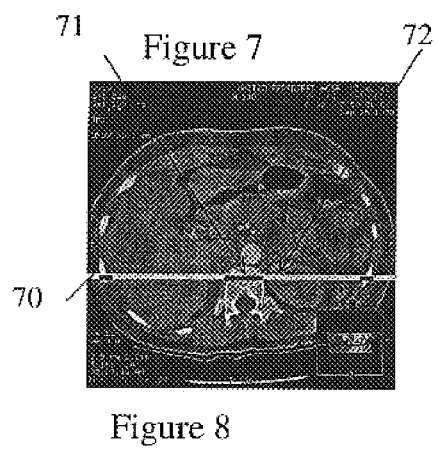
FIG. 7 is an illustration of CT image data to which preferred embodiments of the present invention are applicable.
Figure 8:
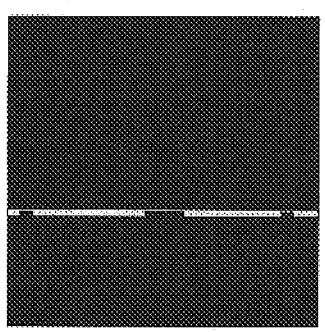
FIG. 8 is an illustration of an interim probability computation of data shown in FIG. 7; and, FIG. 9 is a resultant image using the method of FIG. 1.
Figure 9:
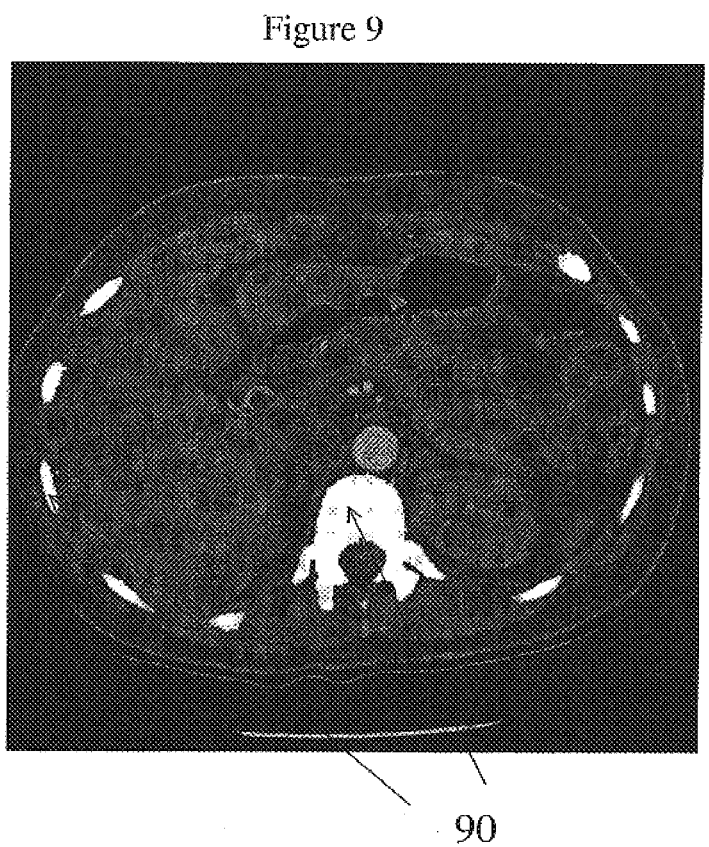

FIGS. 7–9 illustrate representative images using the method of FIG. 1. In FIG. 7, an original slice of CT angiography data is shown with a single ray 70. Region 71 represents high bone probability and region 72 represents low bone probability. FIG. 8 shows the probability buffer calculated for ray 70. FIG. 9 highlights bone regions in bright white. Note that contrast enhanced regions are not classified as bone.

It should be noted that ray processing can analyze the original data as well as any other information derived from the image. For instance gradient information can be pre-calculated from the input image and analyzed during ray processing. It is also the case that ray trajectories can be non-linear, potentially following a blood vessel or some other structure.

It is possible to perform multiple segmentation calculations where the results of one calculation to generate interim segmentations or classifications. For example, growing a region is connected to previously classified bone regions using a final calculation stage.

Given the similarity of the operations with CT back-projection, the method described here can be implemented on CT back-projection hardware. To do this with current back-projection hardware may require that the algorithm change slightly. For instance, for compatibility with back-projection, synthetic view data might be generated that represents the probability of encountering bone along the entire ray. This value would then be attenuated as is done when simulating x-ray transport.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended, claims.

What is claimed is:

1. A method for segmenting an input volume, said method comprising:
    casting a plurality of rays along a plurality of views of said input volume, said rays sampling said input volume for bone-like profile characterstics;
    calculating bone probabilities to identify regions corresponding to said bone-like profile characteristics within each of sad plurality of rays corresponding to each of said plurality views; and,
    processing said identified regions to generate an output volume indicating regions having said bone-like profile characteristics.

2. The method of claim 1 wherein said input volume is derived from computed tomography (CT) image data.

3. The method of claim 1 wherein said input volume is derived from magnetic resonance (MR) image data.

4. The method of claim 1 wherein said input volume is derived from ultrasound image data.

5. The method of claim 1 wherein said input volume is derived from X-ray image data.

6. The method of claim 1 wherein said input volume is scalar data.

7. The method of claim 1 wherein said input volume is vector data.

8. The method of claim 1 wherein said bone-like profile corresponds to at least one of pixel values indicating bone, gradient, bone entrance, total cortical thickness, bone density and fluctuating values in Interior bone.

9. The method of claim 1 further comprising analyzing said identified regions.

10. The method of claim 1 further comprising segmenting said image volume for bone and contrast enhanced vessels.

* * * * *